July 6, 1937.  J. C. DRADER ET AL  2,085,850
GEAR SPEEDER
Filed April 26, 1935    4 Sheets-Sheet 3

INVENTORS.
Joseph C. Drader
William H. Bock.
BY Harness, Dickey, Pierce & Hann.
ATTORNEYS.

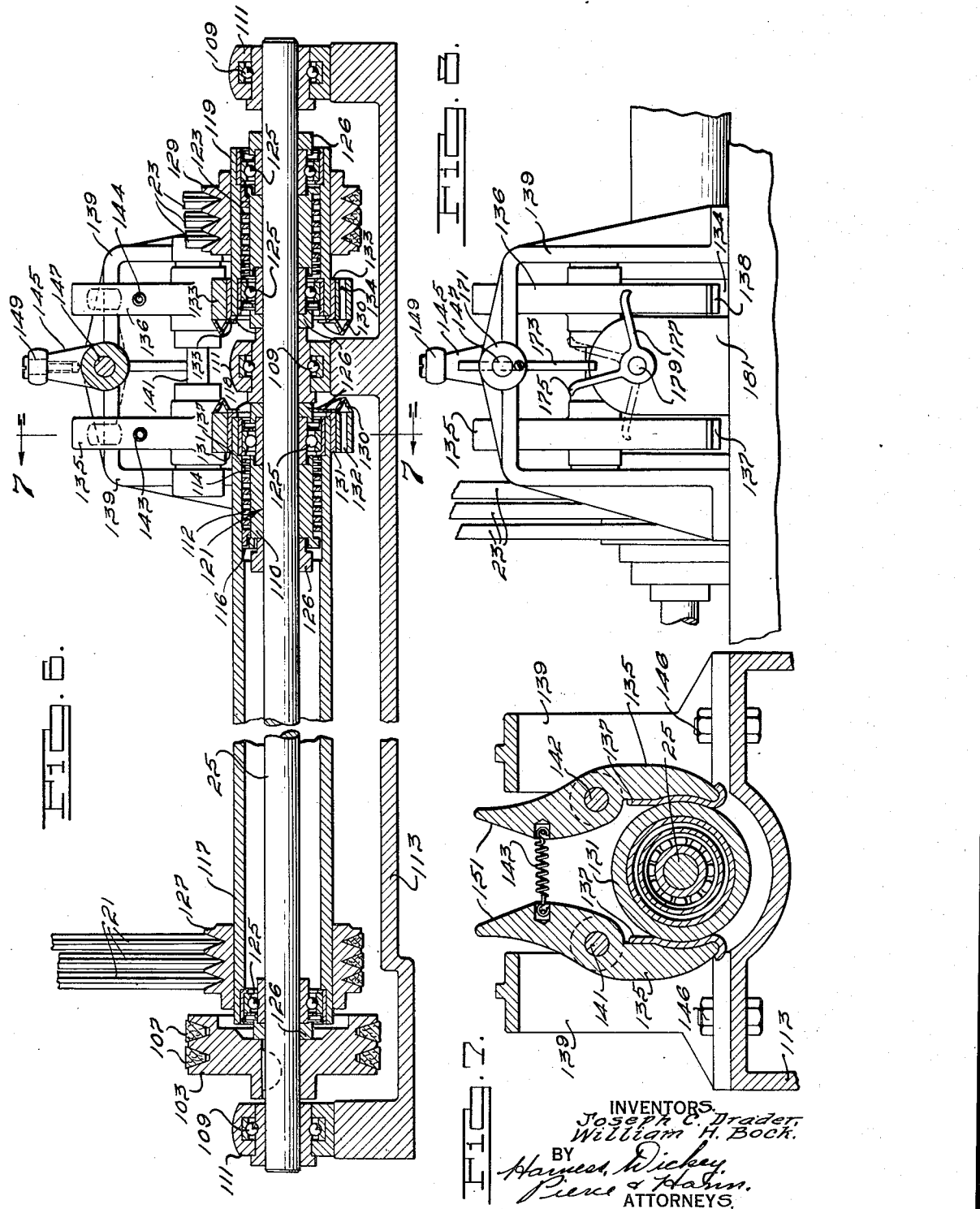

Patented July 6, 1937

2,085,850

UNITED STATES PATENT OFFICE 2,085,850

GEAR SPEEDER

Joseph C. Drader and William H. Bock, Detroit, Mich., assignors to Michigan Tool Company, a corporation of Delaware Application April 26, 1935, Serial No. 18,361

7 Claims. (Cl. 73—51)

The present invention relates to machinery for running together cooperating parts such as gears, and more particularly to such machines as are constructed to speed gears under simulated actual working conditions to check the sound characteristics of the gears.

In certain gear applications, although the directions of rotation of the gears remain the same, the driving relation between the gears is reversed. For example, in connection with automobile transmission gears, during motoring operation the gears directly associated with the crank shaft drive the gears directly associated with the drive shaft. During coasting or braking conditions the reverse is true, and the gears directly associated with the drive shaft drive the gears directly associated with the crank shaft. Under both conditions, however, the directions of rotations of the gears remain the same. In such gear applications, as well as others, it is desirable to run cooperating gears together over a period to insure that they will operate noiselessly.

The present invention provides a construction of gear speeding machine, particularly adapted to duplicate operating conditions of the above mentioned type, and which affords a means of checking the sound characteristics of such gears. In accordance with the illustrated embodiment of the present invention, pairs of cooperating gears are mounted in engaging relation to each other. Both gears of such pairs are selectively connectable to a source of power, so that either may be made the driving member. The just mentioned connections are such that, while either gear is acting as the driven member, it is driven in the same direction as when acting as the driving member. In the illustrated embodiment a common drive shaft is employed, which may be reversed to reverse the driving relation of the gears. In accordance with the present invention also, suitable braking mechanism is provided to impose a load on the driven gear, and as illustrated this braking mechanism is actuable simultaneously with the shaft reversing mechanism.

The principal object of the present invention, accordingly, is to provide a speeding machine for gears in which the gear rotations are always in the same direction, but in which the driving relations between the gears may be selectively reversed.

It is also an object of the present invention to provide a machine of the above type in which a common source of power may be selectively connected to either gear of each pair.

It is a further object of the present invention to provide a machine for speeding gears in which both gears of a pair are suitably loaded while being driven.

It is also an object of the present invention to provide a machine of the above character in which an electric motor is employed as a common source of power for pairs of gears and in which the direction of rotation of the electric motor is reversed to change the driving relation between the gears.

Other objects and advantages of the present construction appear more fully in the following description and in the appended claims.

In the drawings:

Fig. 6 is a view in section taken on the line 6—6 of Fig. 2;

Fig. 7 is a view in section taken on the line 7—7 of Fig. 6; and,

Fig. 8 is a view taken on the line 8—8 of Fig. 2.

Figure 1:
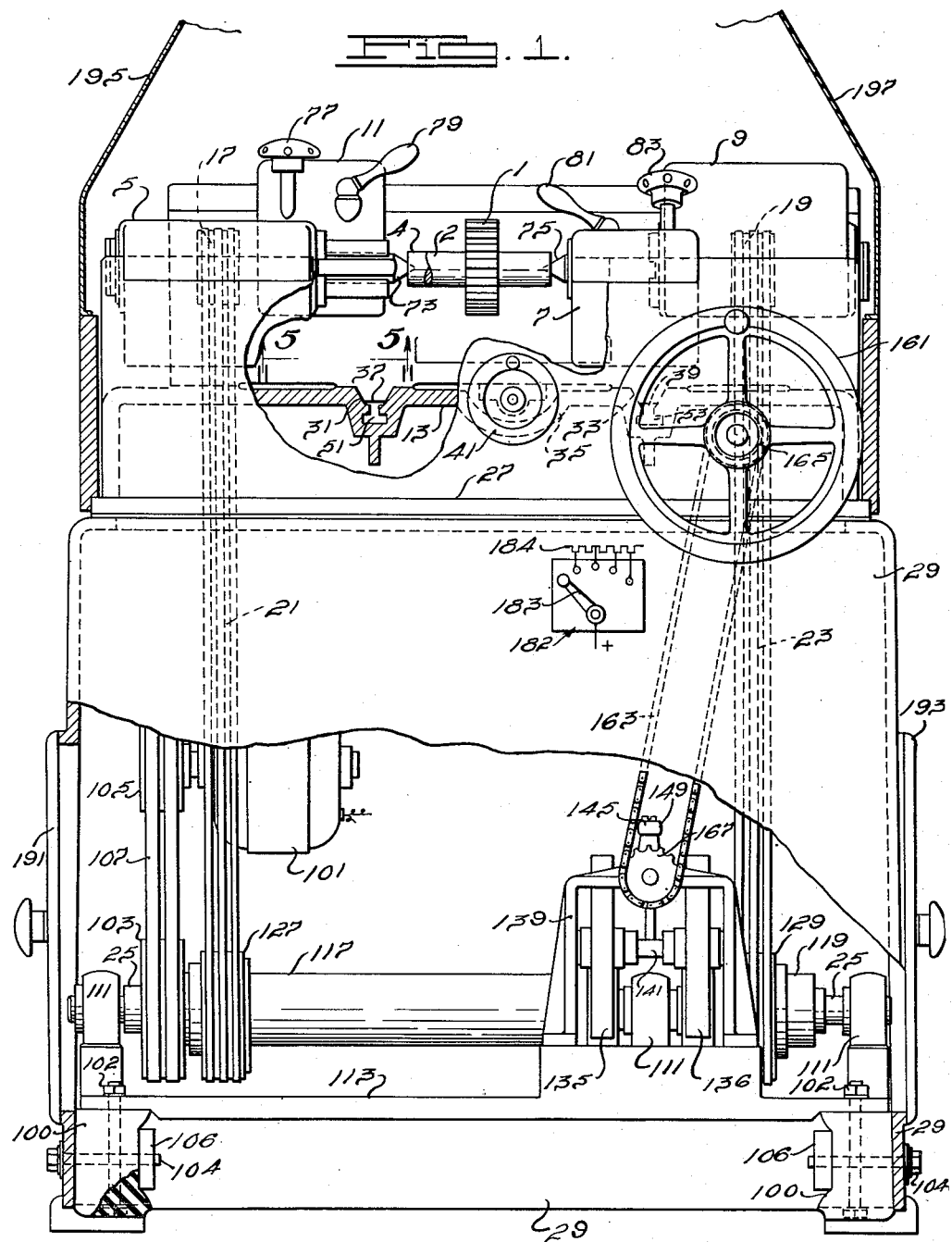
Figure 1 is a view in side elevation, with parts broken away, of a gear machine embodying the present invention.
Figure 2:
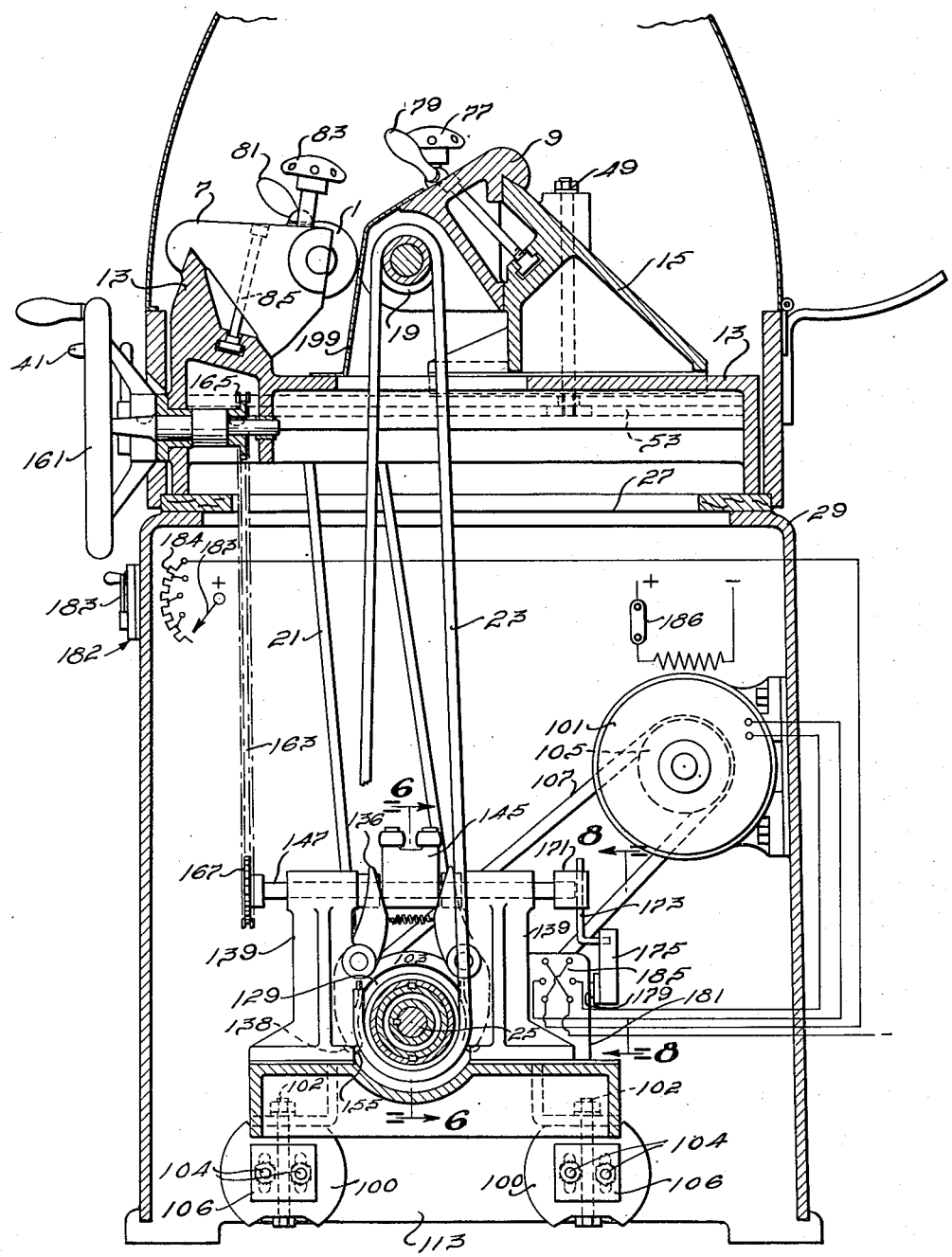
Fig. 2 is a view in end elevation, partly in section, of the machine illustrated in Fig. 1.
Figure 3:
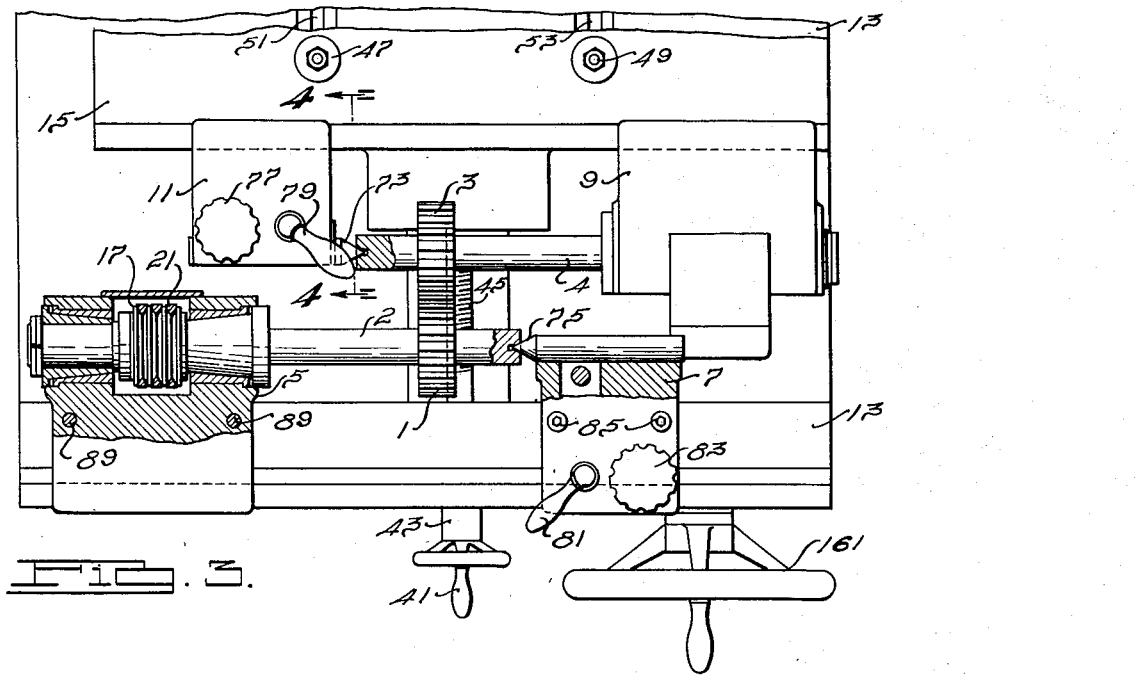
Fig. 3 is a top plan view, partly in section, of the machine shown in Figs. 1 and 2.

Referring to Figs. 1, 2 and 3 of the drawings, gears 1 and 3, which represent a pair of gears to be speeded, are supported on shafts 2 and 4 between head and tail stocks 5 and 7, and 9 and 11, respectively. Stocks 5 and 7 are supported on a bed plate 13. Stocks 9 and 11 are supported on a bed plate 15 which is movable with respect to bed plate 13.

Head stocks 5 and 9, which may be of conventional construction, each embodies pulleys 17 and 19 respectively, which are driven through belts 21 and 23 in response to rotation of shaft 25, in the manner hereinafter described.

Referring in more detail to the arrangement of the above described elements, bed plate 13, which rests upon a member 27 associated with frame 29, is formed with two depressed rail guides 31 and 33 and a depressed portion 35. Bed plate 15 is formed with rail sections 37 and 39, respectively, which enter guides 31 and 33. Wheel 41, fixed in position with respect to bed plate 13 by shank 43, terminates in screw section 45 which may be threaded into bed plate 15 in any conventional manner. As will be understood, rotation of wheel 41 adjusts bed plate 15 with respect to bed plate 13, in order to accommodate gears of different diameters. Bolts 47 and 49 pass through bed plates 15 and are threaded into nuts (not shown) which are slidably received in sections 51 and 53 of bed plate 13, and serve to lock bed plates 13 and 15 in position with respect to each other.

Figures 4, 5:
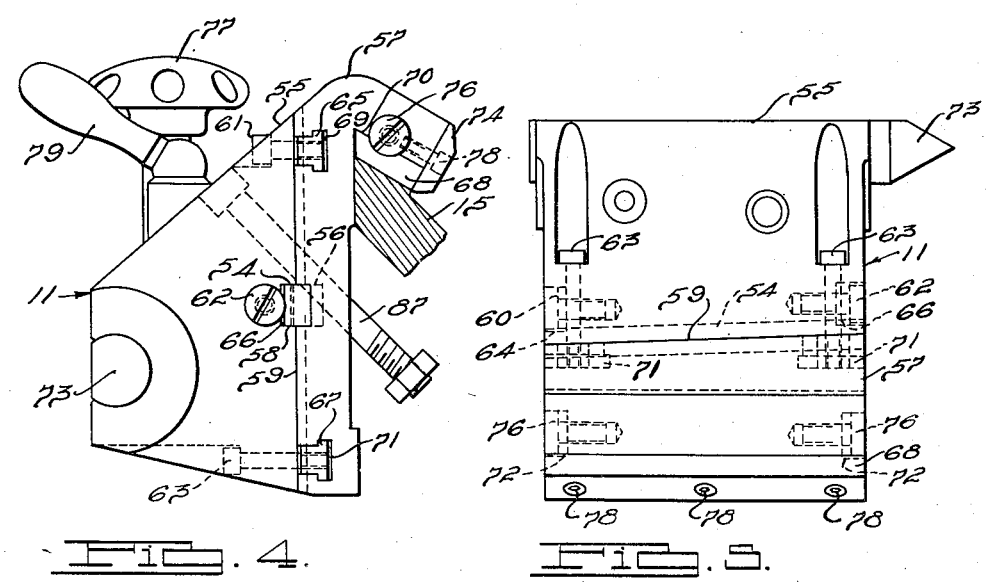
Fig. 4 is a view taken on the line 4—4 of Fig. 3.
Fig. 5 is a view taken on the line 5—5 of Fig. 1.

Referring particularly to Figs. 4 and 5, tail stock 11 is preferably formed in two sections 55 and 57, which engage each other along the surface 59. A rectangular rail 54 is tightly fitted into a rectangular recess 56 formed in section 57 and is slidably fitted into a corresponding recess 58 formed in section 55. Bolts 60 and 62 are threaded into section 55, and are so positioned that the heads thereof can engage cooperating shoulders 64 and 66, respectively, formed at the ends of rail 54. Bolts 60 and 62 serve to provide a micrometer adjustment of the position of sections 55 and 57. If either screw 60 or 62 is turned back so that the head thereof is separated from its cooperating shoulders 64 or 66, the other bolt may be threaded further into section 55, and, rail 54 being fixed in position with respect to section 57, section 55 is caused to move along the inclined surface of section 57. Sections 55 and 57 may be locked in position with respect to each other by bolts 61 and 63 which pass through section 55 and are threaded into nuts 65 and 67 mounted in recesses 69 and 71 formed in portion 57.

A similar vertical adjustment of tail stock 11 with respect to bed plate 15 is provided by insert 68, which engages section 57 along a similar inclined plane 70. Member 70 is provided with shoulders 72, which cooperate with bolts 76 to provide a micrometer adjustment of the position of members 68 and 57 in the manner described above with reference to members 55 and 57. Insert 68 may be locked in position with respect to section 57 by screws 78 which pass through a locking member 74 and are threaded into section 57.

The above described adjustable construction provides an advantageous manner in which a gear supported between stocks 5 and 7 may be accurately aligned with a gear supported between stocks 9 and 11. Tail stock 7 may also be constructed in the manner described above with reference to tail stock 11. The manner in which this may be accomplished is thought to be obvious from the above description of Figs. 4 and 5, and, to simplify the drawings, is not illustrated in detail.

Centers 73 and 75 of tail stocks 11 and 7 respectively are conventionally adjustable with respect thereto by members 77 and 79, and 81 and 83, respectively. Similarly tail stocks 7 and 11 and head stocks 5 and 9 are slidable along their associated bed plates and may be locked thereon in a familiar manner by bolts 85, 87 and 89.

Referring more particularly to Figs. 1, 2, 6 and 7, motor 101, which may be attached to frame 29 in any conventional manner, drives shaft 25 through pulleys 103 and 105 and belt 107. As shown generally in Fig. 1 and in more detail in Fig. 6, shaft 25 is supported in three roller bearing assemblies 109, journaled in bearing standards 111. Bearing standards 111 are supported on bed plate 113, which, in turn, is flexibly supported on rubber supports 100. Rubber supports 100 are secured to bed plate 113 by bolts 102, and to frame 29 by bolts 104, which are threaded into plates 106.

Referring again to Fig. 6, shaft 25 passes through two hollow shaft sections 117 and 119 and may be selectively caused to actuate either one or the other thereof through oppositely arranged over-running clutches, designated generally 121 and 123, which may be of any conventional type, so constructed that during rotation of shaft 25 in one direction, shaft 117 is positively driven through clutch 121 and no driving force is applied to shaft 119 through over-running clutch 123. During rotation of shaft 25 in the other direction, shaft 119 is positively driven through clutch 123 and no driving force is applied to shaft 117 through clutch 121.

In accordance with the illustrated embodiment of the present invention, each of the over-running clutches, for example, over-running clutch 121, comprises a sleeve 110, a coil spring 112, and a relatively light coil spring 114. Springs 112 and 114, which are wound in the same direction and are connected together at their adjacent ends, surround sleeve 110. One end of spring 112 is turned out, and enters an opening formed in a lug 116, formed at the end of sleeve 110. During rotation of shaft 25 and sleeve 110 in one direction, for example, in a clockwise direction with reference to Fig. 2, springs 112 and 114 which rotate therewith, slide relatively freely in shaft 117, and do not apply sufficient torque to it to cause it to rotate. If shaft 25 is rotated in the opposite direction, however, the friction between shaft 117 and springs 112 and 114 tend to unwind these springs, enlarging the coil radii and forcing these coils against shaft 117. It is noted that spring 114, which is of smaller size than spring 112, unwinds more readily than spring 112 and so accomplishes the initial gripping action. As spring 114 positively engages shaft 117, it imposes a drag on spring 112 and forces the latter to also positively engage shaft 117. It will be understood that the clutching action thus produced is proportional to the load being transmitted between shafts 25 and 117 and so forms a positive drive.

As mentioned, over-running clutch 123 is constructed in the manner just described with reference to over-running clutch 121. It will be understood, however, that clutch 123 is oppositely applied so that a clutching action is produced with one clutch during one direction of rotation of shaft 25 and with the other clutch during the other direction of rotation of shaft 25.

Shafts 117 and 119, which may be supported on shaft 25, by roller bearing assemblies 125, and accurately positioned thereon by collars 126, drive pulleys 17 and 19, respectively, through belts 21 and 23 and pulleys 127 and 129, as best shown in Figures 1, 2 and 6.

Referring particularly to Figs. 6, 7, and 8, shafts 117 and 119 are provided with brake drums 131 and 133, respectively. Drums 131 and 133 are each provided with ventilating ducts 132 and 134, respectively, and deflectors 130, arranged in spaced relation near the peripheries thereof, to assist in dissipating the heat generated during the period that the associated gear 1 or 3 is being driven by the other gear. Brake arms 135, provided with brake shoes 137, are rotatably mounted on shafts 141 and 142 between standards 139, and are biased to a brake released position by a spring 143. Corresponding brake arms 136, associated with brake drum 133, are also pivotally mounted on shafts 141 and 142 between standards 139, and are biased to the brake released position by spring 144. As best shown in Figs. 7 and 8, standards 139 may be supported on base plate 113 in any suitable manner, as by means of bolts 146.

A brake applying member 145, pivotally mounted on shaft 147 between standards 139, terminates in two rollers 149. When arm 145 is in one extreme position, rollers 149 engage arms 135 along angular surfaces 151 and force shoes 137 into engagement with brake drum 131, associated with shaft 117. When member 145 is thrown to the opposite extreme position, rollers 149 enter corresponding angular surfaces formed in arms 136, and apply a braking pressure to shaft 119, through the brake shoes 153 and brake drum 134. It will be understood that when brake member 145 occupies the position shown in full lines in Figs. 1, 2, 6 and 8, neither of the brakes are applied, being released under the influence of springs 143 and 144.

Hand wheel 161, suitably journaled in bed plate 13, Figs. 1 and 2, drives shaft 147 through chain 163 and sprockets 165 and 167, and may be rotated to cause brake member 145 to move from the neutral position illustrated in full lines in Figs. 1, 6 and 8, to either of the extreme positions illustrated in dotted lines in the same figures, to thereby correspondingly brake either shaft 117 or 119 or release both of them.

Motor 101 may be operated in either direction, and if desired, at any one of a plurality of operating speeds, in any suitable manner. Preferably, however, and in accordance with the present invention, hand wheel 161, which controls the braking mechanism as above mentioned, also controls reversing mechanism for motor 101, so that the direction of operation of motor 101 may be simultaneously controlled with the reversal of the driving relations between the gears being finished or "run-in".

Referring to Fig. 2, illustrative electrical connections for motor 101 include a face plate rheostat 182, having an arm 183 connected to the positive terminal of a source of power, and arranged to include and exclude sections of a resistor 184 in and from the circuit which leads to the armature of motor 101; a suitable pole changing switch 185, illustrated as located within housing 181; and suitable field connections controlled by a switch 186.

A shaft 179, arranged to actuate the contact of switch 185 in any suitable manner, extends outside of housing 181, and may be rotated by either of two angularly spaced arms 175 and 177. Arms 175 and 177, in turn, are disposed for control by an arm 173, which is secured to shaft 147 by a collar 171. It will be understood that if hand wheel 161 is rotated in a direction to apply a braking force to shaft 117, in the manner above described, arm 173 is rotated in a direction to cause reversing switch 185 to close appropriate contacts to cause motor 101 to operate in a direction to drive shaft 119. Similarly, if hand wheel 161 is rotated in a direction to apply a braking force to shaft 119, switch 185 is correspondingly actuated to cause rotation of motor 101 to be in a direction to drive shaft 117. With this arrangement, the gear 1 or 3, not being driven by motor 101, is subjected to a braking force; and each time the driving relation between the gears is reversed, the brake associated with the driving gear is released, and the brake associated with the driven gear is applied.

As shown in Fig. 8, arms 175 and 177 are somewhat widely spaced apart. The arrangement is preferably such, however, that only a slight amount of movement of either arm 175 or 177 from the illustrated full line position is required to reverse the position of switch 185. Continued movement of the arm in the same direction has no effect upon switch 185. This arrangement may be accomplished in any well known manner as, for example, by frictionally mounting arms 175 and 177 on shaft 179. In operation, accordingly, if arm 173 is rotated in a clockwise direction from the illustrated neutral position, arm 175 is engaged. Upon continued movement of arm 173, arms 175 and 177, which move together, are moved from the illustrated full line positions to the illustrated dotted line positions. During the first part of this movement, switch 185 is actuated to reverse the connections previously completed. Thereafter, arms 175 and 177 rotate with respect to shaft 179. If the motion of arm 173 is now reversed, no motion of arms 175 and 177 occurs until after arm 173 passes the illustrated neutral position and moves into engagement with arm 177. In response to a limited continued movement, switch 185 is again actuated to reverse the armature connections for motor 101.

With the above described construction, it will be noted that switch 185 always occupies one or the other of its actuated positions. As will be apparent to those skilled in the art, however, by suitably reducing the angular spacing between arms 175 and 177, a construction is provided in which, when arm 173 occupies the neutral position or any desired range on either side of the neutral position, switch 185 is also in a neutral position. With this latter arrangement, switch 185 may be employed to control the initial actuation of motor 101 as well as controlling the direction of rotation thereof.

Before describing the operation of the machine as a whole, it may be noted that frame 29 completely surrounds the lower part of the machine, gates 191 and 193 being provided to afford access to shaft 25 and related parts. Also, as shown in Figs. 1 and 2, suitable guards 195 and 197 are preferably provided in connection with the upper moving parts.

Referring now to the operation of the machine as a whole, and assuming that gears 1 and 3 have been suitably positioned with respect to each other, operation of motor 101 may be initiated and the speed thereof adjusted to a suitable value by closing the armature circuit thereof through face-plate rheostat 182.

With arm 145 in the mid position, Fig. 8, brakes 135 and 136 are both released. Arms 175 and 177 are in positions, however, corresponding to a braking action of brake 135. Therefore, reversing switch 185 is in position to cause motor 101 to drive shaft 119. Accordingly, gear 3 is driven through belt 23 and associated parts, and drives gear 1. Hand wheel 161 may be rotated, either before or after the operation of motor 101 is initiated, to apply a braking load to shaft 117 and hence, to gear 1. To do this, hand wheel 161 is rotated in a counter-clockwise direction in Fig. 1 causing rollers 149 to rotate between and separate ends 151 of brake arms 135, thereby forcing these arms into braking relation with drum 131. As will be understood, the braking force applied in this manner is determined by the degree to which hand wheel 161 is turned.

To reverse the driving relation between gears 1 and 3 without altering the directions of rotation thereof, motor 101 may be stopped by, for example, interrupting the armature circuit thereof at face plate rheostat 182. Thereafter, hand wheel 161 may be rotated in a clockwise direction in Fig. 1, to release the brake arms 135 associated with shaft 117 and, upon continued rotation, apply a corresponding braking pressure to shaft 119, through brake arms 136. As previously mentioned, this rotation of hand wheel 161 also rotates switch arm 173 in a direction to reverse the position of switch 185, causing it to close an armature circuit for motor 101, tending to cause operation thereof in the opposite direction.

Upon reclosure of face plate rheostat 182, motor 101 restarts in a direction opposite to the original direction of rotation, and, consequently, drives shaft 117, causing gear 1 to drive gear 3. It is noted that the rotation of gear 1 in response to motor 101 is in the same direction as when it was driven by gear 3. In this case, however, gear 1 represents the driving member and gear 3 represents the loaded driven member. The load, as before mentioned, is proportional to the degree of rotation of hand wheel 161.

Alternatively, the entire reversing operation may be accomplished by wheel 161. During the first part of the operation, the braking load is reduced. Shortly after arm 173 passes the midpoint, switch 185 is reversed, reversing the motor connections and causing motor 101 to stop and restart in the opposite direction. Suitable well known electrical apparatus, forming no part of the present invention, may be employed to protect motor 101 in the course of this "plugging" operation. Upon continued rotation of wheel 161, the load on gear 3 is adjusted to the desired value.

From the foregoing, it is seen that the present invention provides an efficient gear speeding machine of the type in which the direction of rotation of cooperating gears remains the same, but in which the driving relation between them is reversed from time to time and in which a driven gear may be adjustably loaded.

Although a specific embodiment has been described, it is evident that various modifications may be made in the construction and arrangement of parts without departing from the spirit and scope of the present invention. The illustrated embodiment, accordingly, is to be considered in an illustrative, and not in a limiting, sense.

What we claim is:

1. In a machine for running together two cooperating parts such as gears, the combination of means for supporting said parts in driving relation to each other; a shaft for driving each part; a drive member common to said parts; selectively actuable means for connecting one of said shafts to said drive member for rotation thereby in one direction, and for connecting the other shaft to said drive member for rotation thereby in the other direction, so that the driving relation between said parts may be reversed without changing the directions of rotation thereof.

2. In a machine for running together two cooperating parts such as gears, the combination of means for supporting said parts in driving relation to each other; a shaft for driving said parts; means for selectively clutching either of said parts to said shaft to cause that part to drive the other; and means for reversing said shaft to thereby maintain the directions of rotation of said parts the same even though the driving relation between them is reversed.

3. In a machine for running together two cooperating parts such as gears, the combination of means for supporting said parts in driving relation to each other; a shaft for driving each part; a drive member; selectively actuatable means for connecting one of said shafts to said drive member for rotation thereby in one direction, and for connecting the other shaft to said drive member for rotation thereby in the other direction; and means controlled by said last mentioned means for loading said parts.

4. In a machine for running together two cooperating parts such as gears, the combination of means for supporting said parts in driving relation to each other; a drive member common to said parts; a shaft for driving each part; selectively actuatable means for driving one of said shafts from said drive member in one direction and for driving the other shaft from said drive member in the other direction; means for loading said parts; and a control member arranged to control both said selective means and said loading means.

5. In a machine for running together two cooperating parts such as gears, the combination of means for supporting said parts in driving relation to each other; a drive shaft common to said parts; selectively actuable means for clutching one of said parts to said shaft for rotation by said shaft in one direction and for clutching the other of said parts to said shaft for rotation by said shaft in the other direction; means for loading said parts; and a control member arranged to control both said clutching means and said loading means.

6. In a machine for running together two cooperating parts such as gears, the combination of means for supporting said parts in driving relation to each other; a drive shaft common to both parts and reversible means to drive it in either direction; means for clutching one part to said shaft during rotation thereof in one direction; means for clutching the other part to said shaft during rotation thereof in the other direction; means for selectively loading said parts; and a control member arranged to control both said reversible means and said loading means.

7. In a machine for running together two cooperating parts such as gears, the combination of means for supporting said parts in driving relation to each other; a drive shaft common to both said parts and reversible means to drive it in either direction; a shaft section individual to one part and means to clutch it to said drive shaft during rotation thereof in one direction; and a shaft section individual to the other part and means to clutch it to said drive shaft during rotation thereof in the other direction; a braking member associated with each shaft section; and a control member arranged to control both said reversible means and said braking members.

JOSEPH C. DRADER.
WILLIAM H. BOCK.